United States Patent
Okamoto et al.

(10) Patent No.: US 6,766,249 B2
(45) Date of Patent: Jul. 20, 2004

(54) APPARATUS FOR PROVIDING INFORMATION FOR PERSONS IN VEHICLE

(75) Inventors: Satoshi Okamoto, Kanagawa-ken (JP); Norimasa Kishi, Kanagawa-ken (JP); Hiroshi Saito, Kanagawa-ken (JP); Koji Sato, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/949,895

(22) Filed: Sep. 12, 2001

(65) Prior Publication Data

US 2002/0032518 A1 Mar. 14, 2002

(30) Foreign Application Priority Data

Sep. 13, 2000 (JP) ..................... P2000-278135

(51) Int. Cl.[7] .............................................. G01C 21/00
(52) U.S. Cl. ........................................ 701/211
(58) Field of Search .................. 701/23–26, 200, 701/207–211; 340/473, 474, 825.22, 825.24–825.27, 5.32, 996

(56) References Cited

U.S. PATENT DOCUMENTS 6,097,313 A * 8/2000 Takahashi et al. .......... 340/905
2001/0052841 A1 * 12/2001 Polyakov

FOREIGN PATENT DOCUMENTS

| JP | 09-329458 | * 12/1997 | ........... G01C/21/00 |
| JP | 9-329458 | 12/1997 | |
| JP | 10-011696 | * 1/1998 | ......... G08G/1/0968 |

* cited by examiner

Primary Examiner—Thu V. Nguyen
(74) Attorney, Agent, or Firm—McDermott, Will & Emery

(57) ABSTRACT

An apparatus provides information for a driver and passengers in a vehicle. If it is estimated that driving load is high, the apparatus stops outputting information. If it is estimated that driving load has been changed from high to low, the apparatus reads information from a storage unit and outputs the read information. If it is estimated that driving load is high, the apparatus stops outputting information so that the driver and passengers may miss no information, and if it is estimated that driving load is low, the apparatus provides information for the driver and passengers so that they may surely catch the information.

9 Claims, 4 Drawing Sheets

APPARATUS FOR PROVIDING INFORMATION FOR PERSONS IN VEHICLE

BACKGROUND OF THE INVENTION

The present invention relates to an apparatus for providing various information pieces for persons in a vehicle.

An apparatus for providing information from newspapers, magazines, radios, televisions, etc., by voice for persons in a vehicle is disclosed in, for example, Japanese Unexamined Patent Publication No. 09-329458. To improve the understanding of a vehicle driver of voice information, this disclosure controls reading speed and punctuation pauses in response to driving load. When the vehicle passes another vehicle or when the vehicle crosses an intersection, the disclosure slows reading speed or elongates punctuation pauses so that the driver may easily catch voice information.

If the driving load on the driver further increases, slowing reading speed or elongating punctuation pauses is insufficient to allow the driver to properly catch voice information.

SUMMARY OF THE INVENTION

An object of the present invention is to provide an apparatus for providing information for a driver and passengers in a vehicle, capable of surely transmitting information to the driver and passengers.

In order to accomplish the object, a first aspect of the present invention provides an apparatus for providing information for a driver and passengers in a vehicle, having an information source (14, 15, 16) for providing information, a storage unit (17) for storing the information, an output unit (12, 13) for outputting information read from the storage unit for the driver and passengers, a load estimation unit (11) for estimating driving load on the driver, and a controller (11) for controlling, according to the estimated driving load, the storage unit and output unit to read information from the storage unit and output the read information for the driver and passengers through the output unit. If the estimated driving load is high, the controller stops reading and outputting information. If the estimated driving load indicates a high-to-low load change, the controller starts reading and outputting information.

A second aspect of the present invention provides a method of providing information for a driver and passengers in a vehicle. The method includes acquiring information from an information source (14, 15), storing the information in a storage unit (17), outputting information read from the storage unit for the driver and passengers, estimating driving load on the driver, and controlling the information reading and outputting according to the estimated driving load to stop the information reading and outputting if the estimated driving load is high, and if the estimated driving load indicates a high-to-low load change, start the information reading and outputting by going back a predetermined period from the last stoppage of information reading and outputting.

DESCRIPTION OF THE PREFERRED EMBODIMENT

Figure 1:
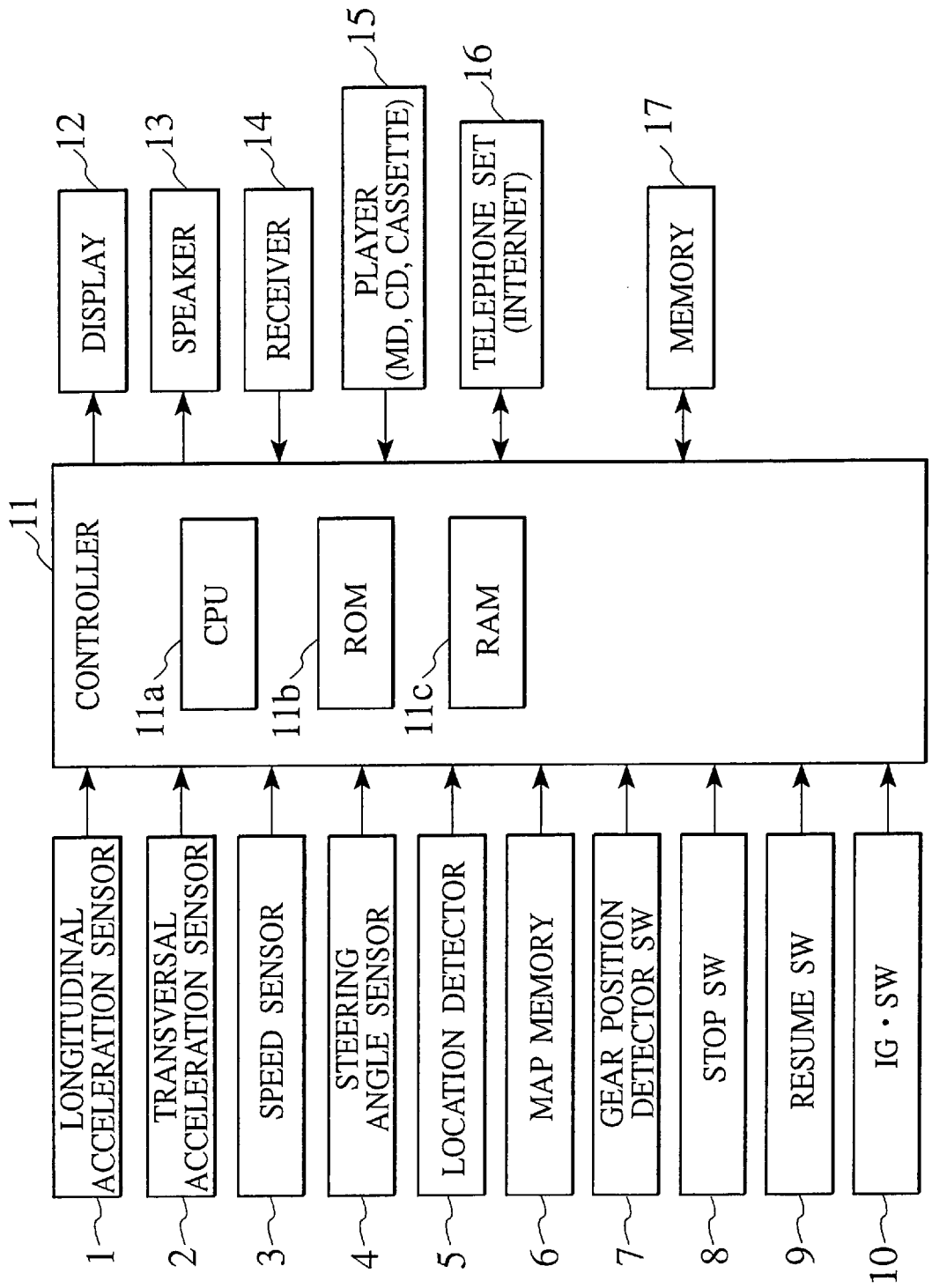
FIG. 1 generally shows the structure of an apparatus for providing information for persons in a vehicle according to a first embodiment of the present invention.

FIG. 1 shows an apparatus for providing information for persons in a vehicle according to the first embodiment of the present invention. The apparatus includes a longitudinal acceleration sensor 1 for detecting an acceleration in the traveling direction of the vehicle and a transversal acceleration sensor 2 for detecting an acceleration in a direction transversal to the traveling direction. A speed sensor 3 detects the traveling speed of the vehicle, and a steering angle sensor 4 detects an angle of the steering wheel of the vehicle. A location detector 5 determines the present location of the vehicle with a satellite navigation system employing aGPS receiver (not shown), a self-contained navigation system employing a mileage sensor (not shown) and direction sensor (not shown), or a beacon system employing roadside beacons (not shown). A map memory 6 stores a road map. A gear position detector 7 detects the position of a shift lever. A stop switch 8 is used to manually stop information output. A resume switch 9 is used to resume information output. An ignition switch 10 is activated when an ignition key of the vehicle is turned on.

The apparatus of FIG. 1 also includes a controller 11 having a CPU 11a, a ROM 11b, a RAM 11c, etc. The controller 11 executes a control program stored in the ROM 11b, to control information to be provided for the persons in the vehicle. A display 12 displays video information, and a speaker 13 provides voice information. A receiver 14 receives voice and video information from radio stations, television stations, FM broadcasting stations, roadside beacons, etc. A player 15 plays back voice and video information from, for example, a CD, MD, DVD, and cassette tape. A telephone set 16 is, for example, a car-phone or cellular phone used to get weather forecast, time, telephone directory, and other voice and video information from, for example, the Internet.

A memory 17 temporarily stores audio and video information from various information sources while load on the driver is high. The memory 17 may be any type of memory such as a semiconductor memory and a disk unit. The capacity of the memory 17 is set to be sufficient to store audio and video information obtained from information sources during a period in which load on the driver is high. If information exceeding the capacity of the memory 17 flows in, older information pieces are abandoned from the memory 17, so that the memory 17 may always be filled with newest information pieces. If required, the memory 17 keeps specific information pieces without abandoning them. It is preferable that the memory 17 stores information pieces from information sources without regard to the level of load on the driver.

In this specification, the "information" includes every type of audio and video information provided for a driver and passengers in a vehicle and the "information sources" include any devices that generate such information. The information includes audio and video information from information sources such as radio stations, television stations, FM broadcasting stations, roadside beacons, cellular phones, car-phones, the Internet, and vehicle-mounted devices such as MD, CD, DVD, and cassette-tape units.

Figure 2:
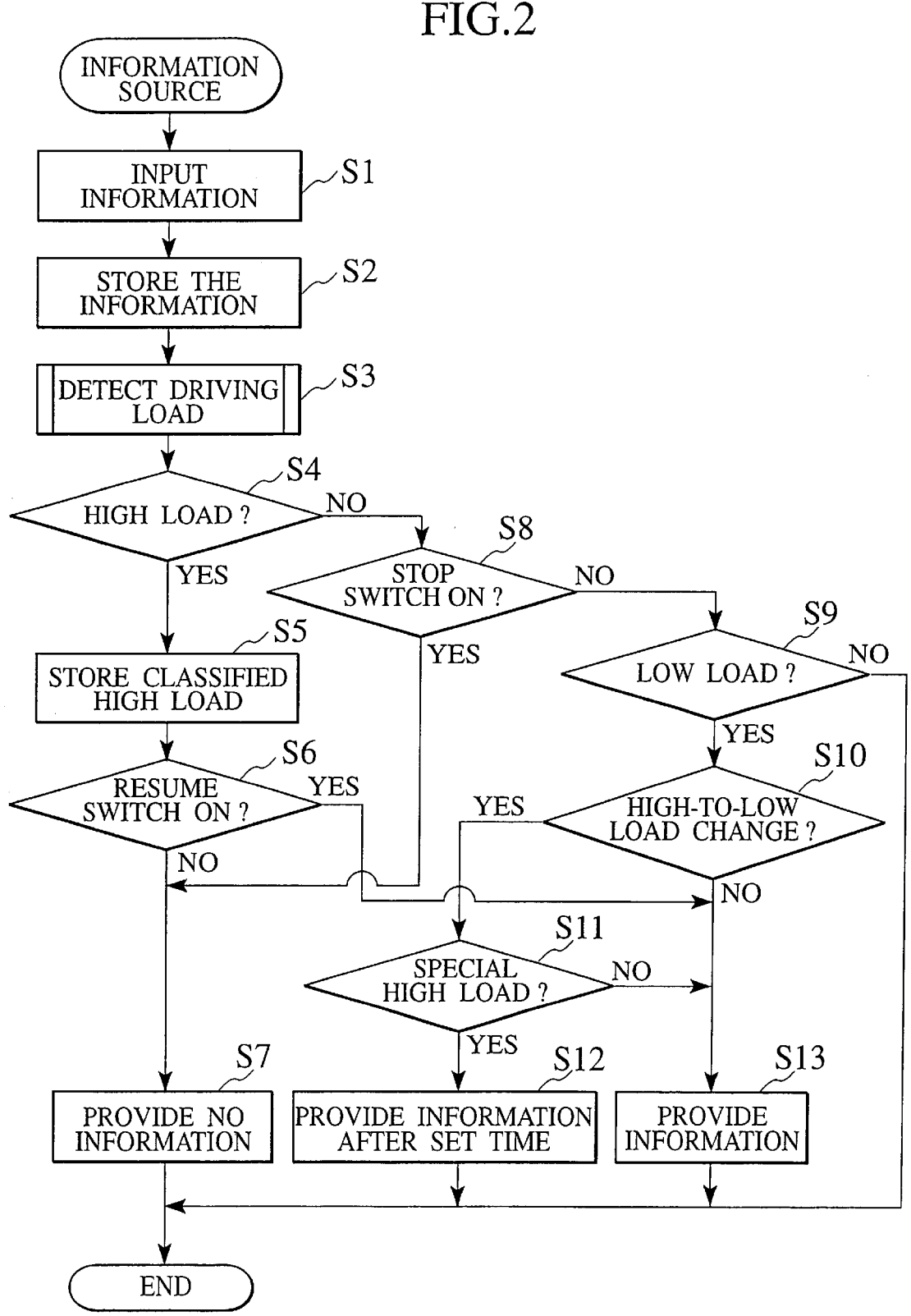
FIG. 2 is a flowchart showing a method of providing information for persons in a vehicle according to a second embodiment of the present invention executable with the apparatus of FIG. 1.

FIG. 2 is a flowchart showing a method of providing information for persons in a vehicle according to the second embodiment of the present invention executable with the apparatus of FIG. 1. The method is realized in the form of a program executed by the CPU 11a in the controller 11 of FIG. 1 at predetermined intervals after the ignition switch 10 is turned on. In step 1, a person in the vehicle selects one of the receiver 14, player 15, telephone 16, and the selected device provides audio and video information. This information is stored in the memory 17 in step 2.

Figure 3:
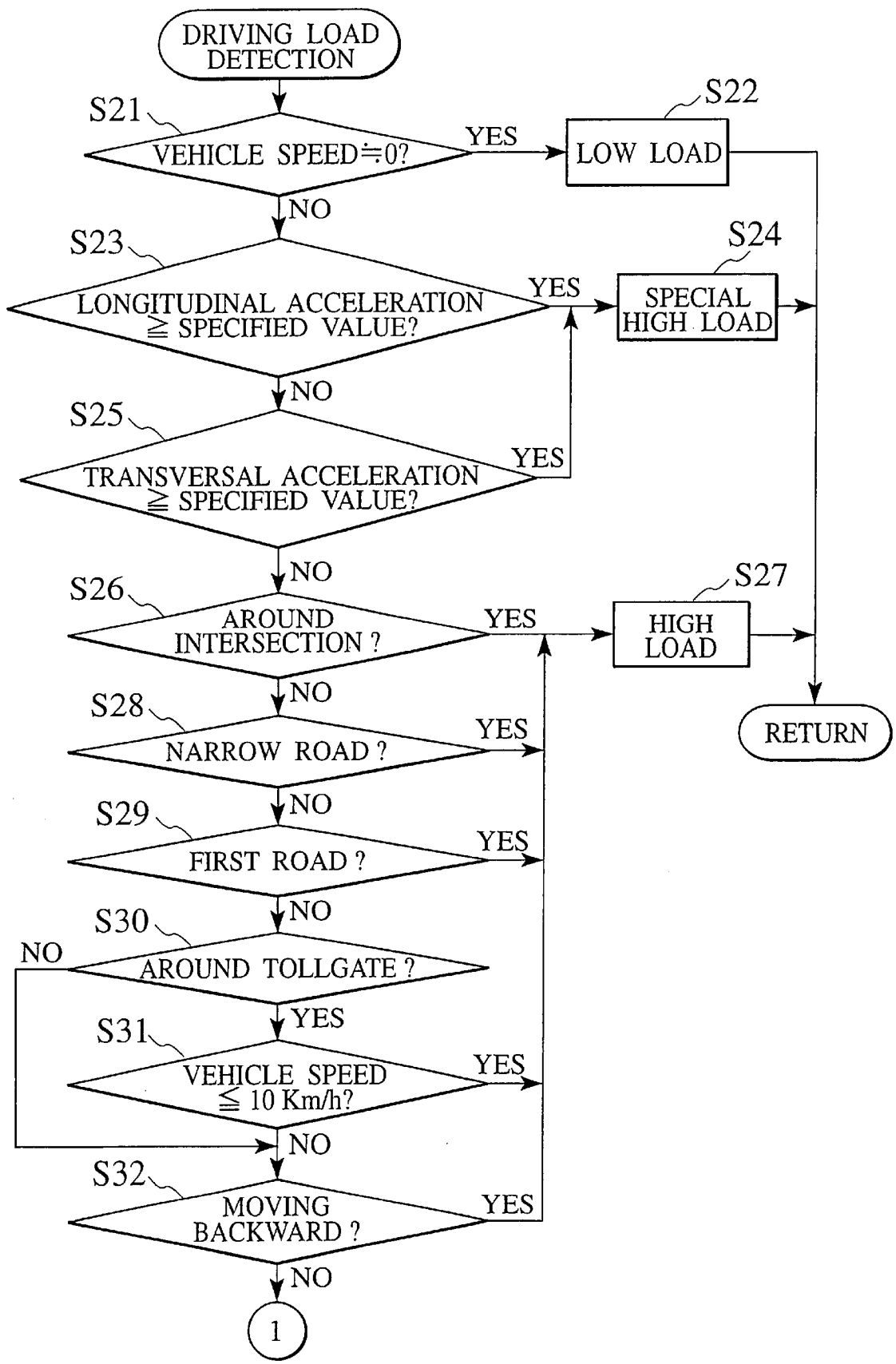
FIGS. 3 and 4 are flowcharts showing the details of a driving load detecting step S3 of FIG. 2.
Figure 4:
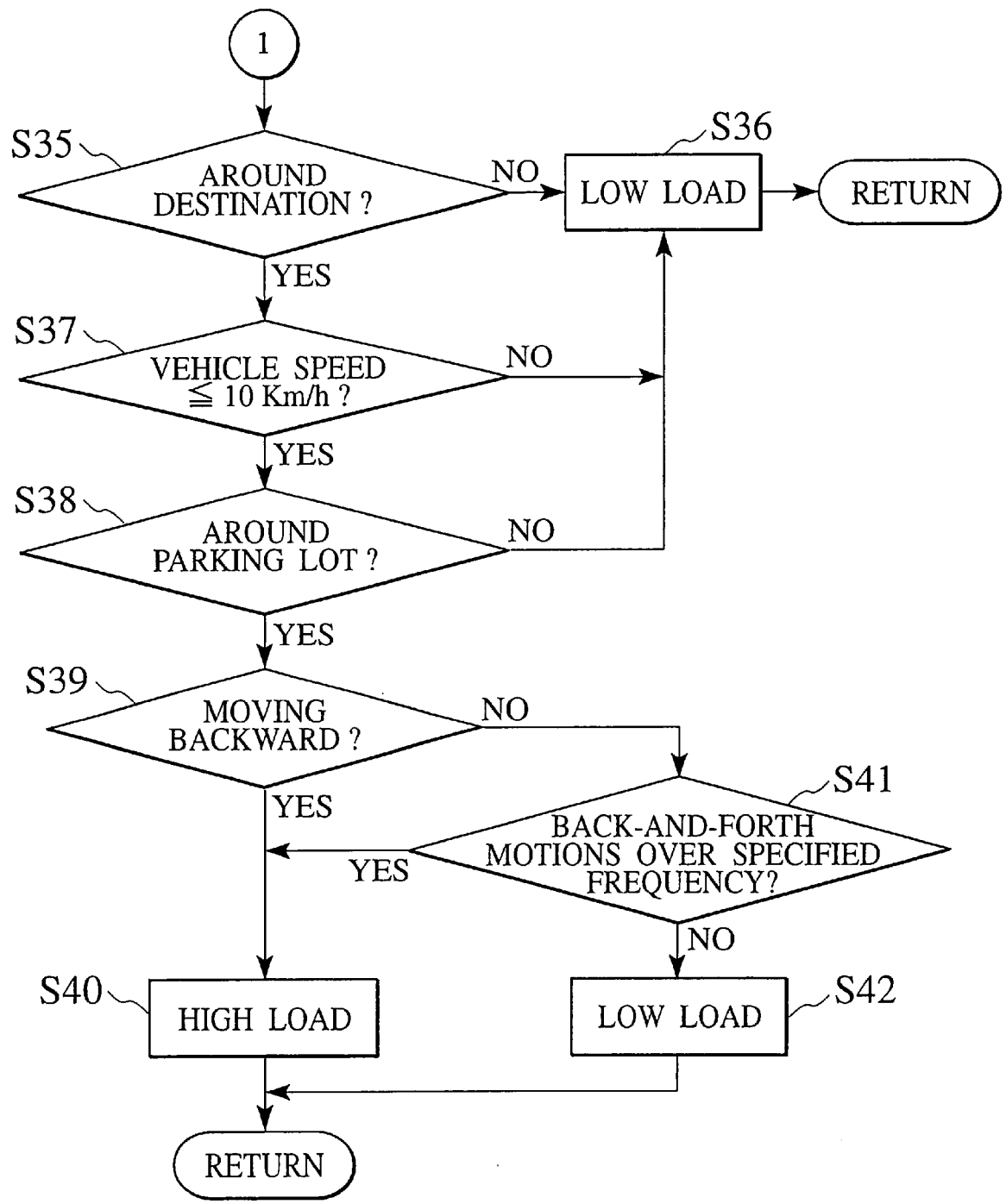

Step 3 carries out a driving load detecting routine whose details are shown in FIGS. 3 and 4. Step 4 determines whether or not the driving load detected in step 3 is high. High load and low load will be explained in detail later. If the detected driving load is high, step 5 is carried out, and if it is low, step 8 is carried out. If the detected driving load is high, step 5 classifies the driving load and stores the classified load. Step 6 checks to see if a person in the vehicle has activated the resume switch 9. If the resume switch 9 is inactive, step 7 is carried out to provide no video or audio information from the display 12 and speaker 13.

Namely, if the driving load on the driver of the vehicle is high, no information is provided, so that the driver has no chance of missing information. If the driving load is low, the driver can surely receive information.

If the driving load is high and if the resume switch 9 is active, it is determined that the driver is strongly intending to receive information. Then, step 13 reads video and audio information from the memory 17 and provides the persons in the vehicle with the read video and audio information through the display 12 and speaker 13. To resume information output after an information output stoppage, information in the memory 17 is read from the information output stoppage point and the read information is provided for the persons in the vehicle through the display 12 and speaker 13.

It is possible to resume information output by going back a predetermined period of, for example, 30 seconds from the information output stoppage point, to overlap the information provided last time and this time for the predetermined period of 30 seconds. This secures information continuity and allows the persons in the vehicle to easily understand the content of the information.

If the step 4 determines that the driving load is not high, step 8 checks to see if the stop switch 8 is active. If the stop switch 8 is active, the step 7 is carried out to output no video or audio information from the display 12 and speaker 13. If the stop switch 8 is inactive, step 9 checks to see if the driving load is low. If the step 4 determines that the driving load is not high, i.e., low, and if the step 9 determines that the driving load is not low, it is determined that an abnormality has occurred, and the program is terminated. When it is determined that the driving load is low, one embodiment may directly provide information from the information sources 14 to 16 for the persons in the vehicle in real time with the use of the display 12 and speaker 13.

Step 10 checks to see if the preceding load is high and the present load is low. Namely, step 10 determines whether or not the driving load indicates a high-to-low load change. If there is no high-to-low load change, step 13 is carried out to output information as mentioned above. If the driving load indicates a high-to-low load change, step 11 is carried out to determine whether or not the preceding high load is special high load.

The special high load occurs when a longitudinal or transversal acceleration of the vehicle is above a predetermined value. For example, a rapid deceleration will be observed when avoiding a collision, and a rapid acceleration will be observed when passing another vehicle. To handle these cases as special, a longitudinal acceleration of, for example, 0.3 G or over is classified as the special high load. Similarly, rapid steering will be observed when avoiding a collision. To handle such a case as special, a transversal acceleration of, for example, 0.3 G or over is classified as the special high load.

Under such special high load, psychological burden on the driver steeply increases. To restore a normal psychological state from such high psychological burden, the driver needs a certain time after the special high load returns to a normal load level. Accordingly, instead of quickly starting information output as soon as the special high load returns to a normal load level, the present invention delays information output by a predetermined time, for example, three minutes from the time when the special high load returns to a normal load level, so that the driver may surely catch information.

If the preceding driving load is high but not the special high load, the driver will speedily restore a normal psychological state. In this case, information output can be resumed as soon as the driving load changes from high to low.

If the step 11 determines that the preceding high driving load is the special high load, step 12 starts information output after the predetermined time. Namely, information is read from the memory 17 after the predetermined time, and the read information is provided for the persons in the vehicle through the display 12 and speaker 13. When resuming information output, it may be resumed from a last information output stoppage point, or it may be resumed by going back a given time period from the last information output stoppage point. If requested, latest information may be output without regard to the last information output stoppage point.

When resuming information output, the controller 11 may thin information depending on the content of the information, to provide only an outline of the information for the persons in the vehicle. This reduces the amount of information to be reproduced for an information output stoppage period, thereby shortening a playback time for the information output stoppage period. Instead, the controller 11 may increase a playback speed of the information within the information output stoppage period, to shorten a playback time. With these techniques, the present invention shortens a playback time of the information in the information output stoppage period, to catch up live information to be provided from the information sources in real time.

The details of the driving load detecting step 3 of FIG. 2 will be explained with reference to FIGS. 3 and 4. Step 21 checks to see if a vehicle speed detected by the speed sensor 3 is zero. Namely, the step 21 checks to see if the vehicle is stopped. If the vehicle is stopped, step 22 determines that the driving load is low, and the flow returns to the step 4 of FIG. 2.

If the vehicle speed is not zero, step 23 checks to see if a longitudinal acceleration detected by the longitudinal acceleration sensor 1 is above a predetermined value. If it is above the predetermined value, step 24 determines that the driving load is the special high load, and the flow returns to the step 4 of FIG. 2. If the longitudinal acceleration is below the predetermined value, step 25 checks to see if a transversal acceleration detected by the transversal acceleration sensor 2 is above a predetermined value. If it is above the predetermined value, the step 24 determines that the driving load is the special high load, and the flow returns to the step 4 of FIG. 2.

Step 26 refers to a present vehicle location detected by the location detector 5 and the road map stored in the map memory 6 and checks to see if the vehicle is running around an intersection. If the vehicle location is within, for example, 50 m from the center of an intersection, it is determined that the vehicle is driving around the intersection. In this case, step 27 determines that the driving load is high because the driver must pay intensive attention to driving around the intersection. Then, the flow returns to the step 4 of FIG. 2.

Step 28 refers to the vehicle location detected by the location detector 5 and the road map stored in the map memory 6 and determines whether or not the vehicle is driving along a narrow road. The narrow road is defined as, for example, a minor road below a city road, or a road narrower than 3 m in width. If the vehicle is driving along a narrow road, the step 27 determines that the driving load is high because the driver must pay an intensive attention to driving along the narrow road. Then, the flow returns to the step 4 of FIG. 2.

Step 29 refers to driving history based on the location detector 5 and determines whether or not the present road is a first or inexperienced road for the vehicle. For example, the controller 11 stores a route driven by the vehicle for the last two weeks, or a route of 100 km run by the vehicle. Any route that differs from the stored route is determined as a first one. If the vehicle is running along a first or inexperienced road, the step 27 determines that the driving load is high because the driver must pay more attention to driving the inexperienced road. Then, the flow returns to the step 4 of FIG. 2.

If the driver has some areas in his or her mind to pay special attention to driving through the areas, the driver may set the areas in the controller 11 in advance. In this case, the flow of FIG. 3 includes an additional step of determining whether or not the vehicle is driving through one of such areas. If the step determines that the vehicle is driving through one of such areas, the step determines that the driving load is high and returns to the step 4 of FIG. 2.

Step 30 refers to the vehicle location detected by the location detector 5 and the road map in the map memory 6 and determines whether or not the vehicle is running around a tollgate. If the vehicle is within, for example, 10 m from a tollgate, the step 30 determines that the vehicle is driving around the tollgate. In this case, step 31 checks to see if the vehicle speed detected by the speed sensor 3 is below, for example, 10 km/h. If the vehicle is running at a low speed around the tollgate, it is presumed that a toll is going to be paid and that special attention is needed not only to drive the vehicle but also to pay the toll. Therefore, the step 27 determines that the driving load is high and returns to the step 4 of FIG. 2.

Step 32 checks to see if a gear position detected by the gear position detector 7 is a back position. Namely, the step 32 checks to see if the vehicle is driving backward. If the vehicle is backing, the step 27 determines that the driving load is high and returns to the step 4 of FIG. 2. An encoder may be attached to a shaft or a wheel, to generate a pulse signal representing a rotational angle of the shaft or wheel based on which a backward movement of the vehicle is detectable.

Step 35 of FIG. 4 refers to the vehicle location detected by the location detector 5 and the road map in the map memory 6 and checks to see if the vehicle is running around a destination. If the vehicle is running around the destination, step 37 checks to see if the vehicle speed is below 10 km/h. If the vehicle is running around the destination at a low speed, step 38 checks to see if the vehicle is driving around a predetermined parking lot. If the vehicle is driving around the parking lot, step 39 checks to see if the vehicle is moving backward. If the vehicle is backing in the parking lot, step 40 determines that the driving load is high and returns to the step 4 of FIG. 2. If the vehicle is not backing, step 41 checks to see if the vehicle is moving back and forth more than predetermined times. If the vehicle is frequently moving back and forth, the step 40 determines that the driving load is high and returns to the step 4 of FIG. 2. If the frequency of the back-and-forth movement of the vehicle is less than the predetermined value, step 42 determines that the driving load is low and returns to the step 4 of FIG. 2.

According to one embodiment, a traveling direction of the vehicle may be determined from temporal changes in vehicle location, to determine whether or not the vehicle is moving toward or away from a destination, to help make correct determination in the steps 35 to 38.

If the step 35 determines that the vehicle is not in the vicinity of the destination, or if the step 37 determines that the vehicle is running around the destination at a high speed, or if the step 38 determines that the vehicle is running around the destination but not around the parking lot, step 36 determines that the driving load is low and returns to the step 4 of FIG. 2.

In this way, if the driving load is high, the present invention provides no information for the persons in the vehicle through the display 12 and speaker 13. If the driving load indicates a high-to-low load change, the present invention starts reading information from the memory 17 and providing the read information for the persons in the vehicle through the display 12 and speaker 13. The present invention provides no information for the driver if the driving load on the driver is high, so that the driver may miss no information. When the driving load is low, the present invention provides the driver with information, so that the driver may surely catch the information.

Information types and information sources handled by the present invention are not limited to those explained with reference to the embodiments. Other information types and information sources are also applicable to the present invention. The high and low driving load conditions mentioned in the embodiments must not be considered to limit the present invention. According to the present invention, any driving condition that requires a driver to concentrate on the driving of a vehicle may be defined as a high driving load condition, and other driving conditions may be defined as low driving load conditions.

The entire content of a Japanese Patent Applications No. 2000-278135, filed on Sep. 13, 2000 is hereby incorporated by reference. The scope of the invention is defined with reference to the following claims.

What is claimed is:

1. An apparatus for providing information for a driver and passengers in a vehicle, comprising:

an information source for providing information;

a storage, the storage storing the information;

an output unit, the output unit outputting information read from the storage for the driver and passengers; and a controller, the controller estimating driving load on the driver, and the controller controlling the storage and output unit to read information from the storage and output the information according to the estimated driving load, wherein if the estimated driving load is high, the controller stops reading and outputting the information, and if the estimated driving load indicates a high-to-low load change following special high load, the controller waits for a predetermined period after the detection of the high-to-low load change and starts reading information from the storage and outputting the stored information.

2. The apparatus of claim 1, wherein
if the estimated driving load indicates a high-to-low load change, the controller starts reading information from the storage by going back a predetermined period from a last stoppage point and outputting the information.

3. The apparatus of claim 1, further comprising
an acceleration detector, the acceleration detector detecting longitudinal and transversal accelerations of the vehicle, wherein
the controller determines that the estimated driving load is special high load if one of the detected longitudinal and transversal accelerations is above a predetermined value.

4. The apparatus of claim 1, wherein
if the estimated driving load indicates a high-to-low load change, the controller starts reading information from the storage by thinning the information and outputting the thinned information.

5. The apparatus of claim 1, wherein
if the estimated driving load indicates a high-to-low load change, the controller starts reading information from the storage and outputting the read information at an increased speed.

6. The apparatus of claim 1, further comprising
a starter, the starter forcibly starting to read and output the stored information after the controller stops reading, and the starter outputting the stored information due to high driving load.

7. The apparatus of claim 1, further comprising at least one of:
a detector for detecting present location of the vehicle;
a storage for storing a road map;
a detector for detecting a vehicle speed; and
a detector for detecting a backward move of the vehicle, wherein
the controller estimates that the driving load is high if the at least one of the means detect that the vehicle is running around an intersection, or along a narrow road, or along a first or inexperienced road, or around a tollgate at a predetermined speed or below, or in a backward direction, or repeatedly in back-and-forth directions in a parking lot around a destination.

8. An apparatus for providing information for a driver and passengers in a vehicle, comprising:
an information source for providing information;
storage means for storing the information;
output means for outputting information read from the storage means for the driver and passengers; and
control means for estimating driving load on the driver and controlling, according to the estimated driving load, the storage means and output means to read information from the storage means and output the read information for the driver and passengers through the output means, wherein
if the estimated driving load is high, the control means stops reading and outputting the stored information, and if the estimated driving load indicates a high-to-low load change following special high load, the control means waits for a predetermined period after the detection of the high-to-low load change and starts reading information from the storage means and outputting the stored information.

9. A method of providing information for a driver and passengers in a vehicle, comprising:
storing information obtained from an information source;
reading and outputting the stored information for the driver and passengers;
estimating driving load on the driver;
stopping reading and outputting the stored information if the estimated driving load is high; and
waiting for a predetermined period after the detection of the high-to-low load change and starting to read and output the stored information by going back a predetermined period from a last stoppage point if the estimated driving load indicates a high-to-low load change following special high load.

* * * * *